US007826960B2

(12) United States Patent
Ellmer et al.

(10) Patent No.: US 7,826,960 B2
(45) Date of Patent: Nov. 2, 2010

(54) METHOD AND DEVICE FOR CONTROLLING AN INTERNAL COMBUSTION ENGINE

(75) Inventors: Dietmar Ellmer, Regensburg (DE); Rüdiger Herweg, Esslingen (DE); Thorsten Lauer, Holzheim a. Forst (DE); Michael Mladek, Karlsruhe (DE); Mayk Stelter, Stuttgart (DE)

(73) Assignee: Continental Automotive GmbH, Hannover (DE)

( * ) Notice: Subject to any disclaimer, the term of this patent is extended or adjusted under 35 U.S.C. 154(b) by 641 days.

(21) Appl. No.: 11/659,404

(22) PCT Filed: Jul. 20, 2005

(86) PCT No.: PCT/EP2005/053496

§ 371 (c)(1),
(2), (4) Date: Nov. 7, 2007

(87) PCT Pub. No.: WO2006/015928

PCT Pub. Date: Feb. 16, 2006

(65) Prior Publication Data

US 2008/0183364 A1 Jul. 31, 2008

(30) Foreign Application Priority Data

Aug. 5, 2004 (DE) .................. 10 2004 038 122

(51) Int. Cl.
*G06F 19/00* (2006.01)
*G06G 7/70* (2006.01)
*F02M 7/087* (2006.01)
*F02M 7/28* (2006.01)
*F02M 69/04* (2006.01)
*F02D 41/38* (2006.01)
*F02B 47/08* (2006.01)

(52) U.S. Cl. ................ 701/111; 701/101; 701/102; 701/105; 701/108; 123/435; 123/445; 123/464; 123/676; 123/568.14

(58) Field of Classification Search ............... 123/435, 123/445, 464, 472, 676, 299, 300, 568.14; 701/101–105, 108, 111, 115; 73/114.02, 73/114.16, 114.06, 114.17, 114.76; 702/50, 702/182, 183, 187
See application file for complete search history.

(56) References Cited

U.S. PATENT DOCUMENTS

| 4,621,603 | A  | * | 11/1986 | Matekunas ............... 123/435 |
| 4,624,229 | A  | * | 11/1986 | Matekunas ............ 123/406.41 |
| 5,219,227 | A  |   | 6/1993  | Yang et al. |
| 6,484,694 | B2 | * | 11/2002 | Thomas .................... 123/435 |
| 6,612,294 | B2 | * | 9/2003  | Hiraya et al. .......... 123/568.14 |
| 7,454,286 | B2 | * | 11/2008 | Sinnamon et al. ........... 701/110 |
| 7,594,493 | B2 | * | 9/2009  | Matekunas et al. .......... 123/299 |
| 2002/0046741 | A1 |   | 4/2002 | Kakuho et al. |
| 2005/0039721 | A1 | * | 2/2005 | Truscott et al. ........ 123/406.22 |
| 2007/0250255 | A1 | * | 10/2007 | Matekunas et al. .......... 701/114 |
| 2009/0095256 | A1 | * | 4/2009 | Ellmer et al. ............... 123/435 |

FOREIGN PATENT DOCUMENTS

| DE | 199 00 738 C1 | 6/2000 |
| DE | 199 52 096 C2 | 5/2001 |
| EP | 0 399 069 A1 | 11/1990 |
| EP | 1 138 896 A2 | 10/2001 |

OTHER PUBLICATIONS

D.J. Rausen, A.G. Stefanopoulou, J.-M. Kang, J.A. Eng and T.-W. Kuo, "A mean-value model for control for homogeneous charge compression ignition (HCCI) engines", American Control Conference, 2004, Proceedings of the 2004 Boston, MA, USA, Jun. 30-Jul. 2, 2004, Piscataway, NJ, USA, IEEE, vol. 1, Jun. 30, 2004, pp. 125-131, XP010761029, Abstract.

DIPL.-ING.Eckart Schloz Aus Marbach, "Untersuchungen zur homogenen Dieselverbrennung bei innerer Gemischbildung", Dissertation, Jan. 24, 2003, pp. 127-128.

* cited by examiner

*Primary Examiner*—Stephen K Cronin
*Assistant Examiner*—Raza Najmuddin
(74) *Attorney, Agent, or Firm*—King & Spalding L.L.P.

(57) ABSTRACT

The invention is directed toward a device for controlling an internal combustion engine. An aspect of the invention is determining a polytropic exponent according to at least two measured values of the pressure in a combustion chamber of a cylinder of an internal combustion engine during the working stroke of the cylinder once an air/fuel mixture of a cylinder has been burned and before the gas discharge valve is opened. A first exhaust gas temperature is determined and a second temperature of the exhaust gas is determined in accordance with the first exhaust gas temperature. The pressure associated in the combustion chamber, the pressure prevailing in the combustion chamber after closing the gas discharge valve, and the polytropic exponent are determined. An actuation signal for controlling an actuating member of the internal combustion engine is generated according to the second temperature of the exhaust gas.

15 Claims, 3 Drawing Sheets

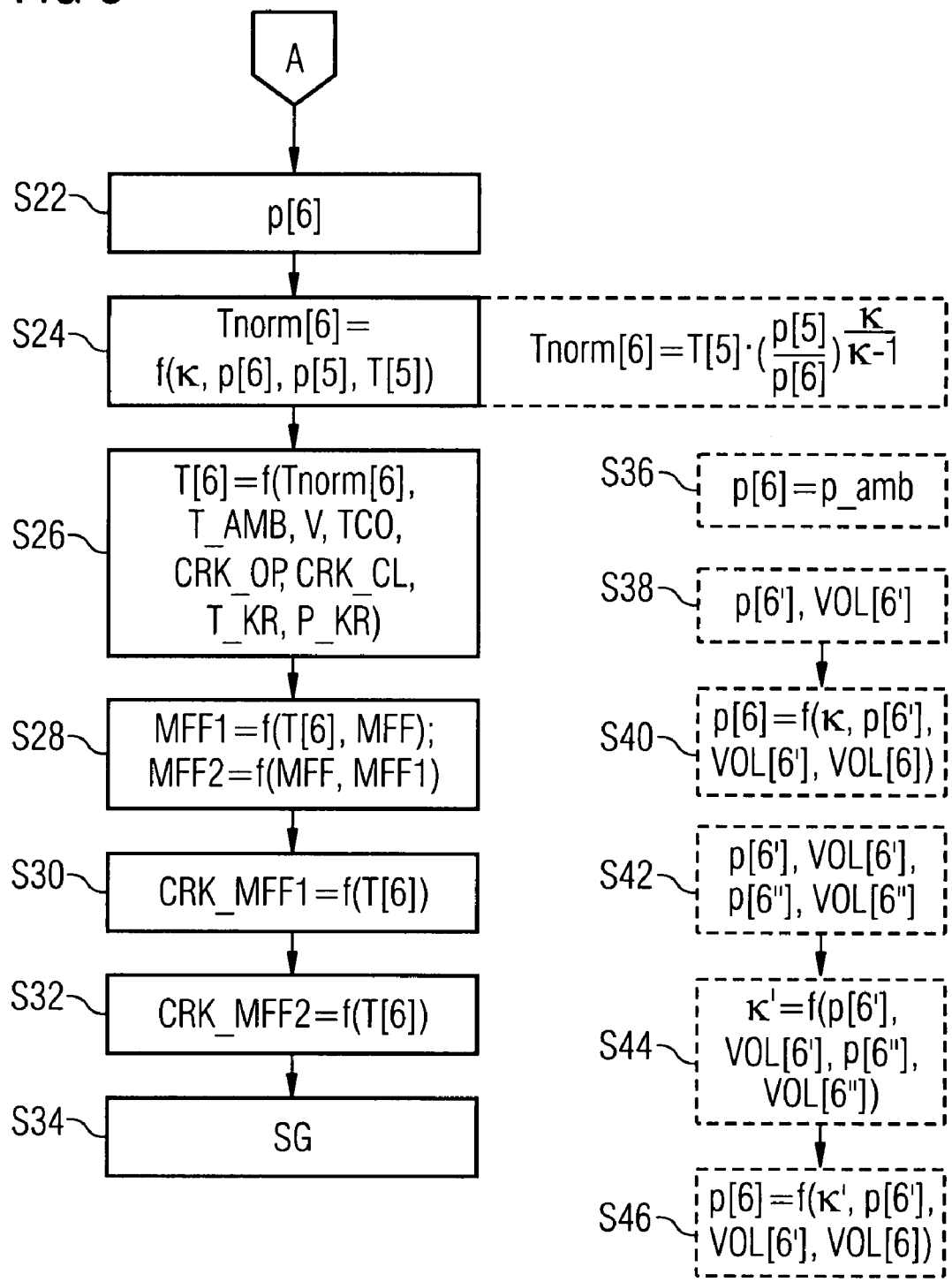

METHOD AND DEVICE FOR CONTROLLING AN INTERNAL COMBUSTION ENGINE

CROSS REFERENCE TO RELATED APPLICATIONS

This application is the US National Stage of International Application No. PCT/EP2005/053496, filed Jul. 20, 2005 and claims the benefit thereof. The International Application claims the benefits of German application No. 10 2004 038 122.4 filed Aug. 5, 2004, both of the applications are incorporated by reference herein in their entirety.

FIELD OF INVENTION

The invention relates to a method and a device for controlling an internal combustion engine having at least one cylinder in which is embodied a combustion chamber and to which is assigned a piston, having an intake manifold that communicates with the combustion chamber of the cylinder as a function of the position of a gas intake valve, having an exhaust manifold that communicates combustion chamber of the cylinder as a function of the position of a gas exhaust valve, and having a cylinder pressure sensor that registers the pressure in the cylinder's combustion chamber.

BACKGROUND OF THE INVENTION

Rising energy costs and more stringent legislation governing the permissible fuel consumption or permissible noxious emissions of motor vehicles containing internal combustion engines necessitate measures to, on the one hand, reduce the fuel consumption of internal combustion engines and, on the other, insure that the noxious emissions produced by the motor vehicle assume low values. It has in this regard become known how to operate internal combustion engines, in particular gasoline-operated engines, in certain phases of their operation by means of an auto-igniting combustion method that is also referred to as Homogeneous Charge Compression Ignition (HCCI), Compressed Auto Ignition (CAI), or Chamber Ignition (CI). With said auto-igniting combustion method, auto-igniting, and hence the course of combustion, is controlled via the reactive amount of energy in the cylinder of the internal combustion engine. Said amount of energy can be provided by, inter alia, what is in comparison with the conventionally operated spark ignition engine a very high proportion of residual gas. It is known also in the case of conventionally operated spark ignition engines how to operate the internal combustion engine in the lower and mid underload range at a high exhaust gas recirculation rate in order to optimize combustion in terms of the quality criteria "consumption" and "emissions".

A method for determining the curve of a combustion chamber pressure in an internal combustion engine is known from DE 199 007 38 C1. Said method entails obtaining an estimated value of a cylinder pressure as a function of a previously obtained measured value of the cylinder pressure, of a volume, assigned thereto, of the cylinder, and of a volume, assigned to the estimated value of the cylinder pressure, of the cylinder, and of a polytropic exponent by means of the polytropic equation. The polytropic exponent is predefined as a function of a coolant temperature.

A further method for determining the combustion chamber pressure in a cylinder of an internal combustion engine is known from EP 0 399 069 A1. A sensitivity of the cylinder pressure sensor assigned to said internal combustion engine is determined for this purpose in each operating cycle of the cylinder, specifically as a function of three voltage measurement signals and a predefined polytropic exponent.

SUMMARY OF INVENTION

The object of the invention is to provide a method and a device for controlling an internal combustion engine, both of which will insure precise controlling of the internal combustion engine.

The invention is characterized by a method and a corresponding device for controlling an internal combustion engine having at least one cylinder in which is embodied a combustion chamber and to which is assigned a piston, having an intake manifold that communicates with the combustion chamber of the cylinder as a function of the position of a gas intake valve, and having a cylinder pressure sensor that registers the pressure in the combustion chamber of the cylinder. A polytropic exponent is determined as a function of at least two measured values of the pressure in the combustion chamber that are registered during the power stroke of the cylinder once an air/fuel mixture contained in the cylinder has been completely burned and before the gas exhaust valve opens. Determining of the polytropic exponent is based on the knowledge of there being a strong correlation between cylinder pressure and gas temperature only after the air/fuel mixture has been completely burned, while the temperature curve is very difficult to estimate while the air/fuel mixture is burning.

A first temperature of the exhaust gas is determined that is characteristic of the temperature of the exhaust gas before the gas exhaust valve opens, in particular of the temperature of the exhaust gas immediately before the gas exhaust valve opens. A second temperature of the exhaust gas remaining in the combustion chamber of the cylinder after the gas exhaust valve closes is determined, specifically as a function of the first temperature of the exhaust gas, of the pressure, assigned to the first temperature, in the combustion chamber, which is to say the pressure prevailing at the time of the first temperature, and, further, as a function of the pressure in the combustion chamber after the gas exhaust valve closes, and of the polytropic exponent. An actuation signal for controlling an actuating member of the internal combustion engine is generated as a function of the second temperature of the exhaust gas. Said second temperature can thus be determined simply and precisely and will affect the course of the next process of burning the air/fuel mixture in the combustion chamber of the cylinder of the internal combustion engine. The internal combustion engine can be controlled very precisely through generating of the actuation signal for controlling an actuating member of the internal combustion engine as a function of the second temperature of the exhaust gas.

In an advantageous embodiment of the invention the measured values of the pressure are registered at a crankshaft angle greater than a predefined crankshaft angle that is predefined such that burning of the air/fuel mixture will have been completed.

In this connection it will be advantageous for the predefined crankshaft angle to be around 80 after the piston's top dead center. That has the advantage that burning of the air/fuel mixture will then have been reliably completed. Depending on how the internal combustion engine is embodied, in particular in the case of an HCCI combustion method, the predefined crankshaft angle can also be selected as being substantially nearer the piston's top dead center.

In a further advantageous embodiment of the invention the predefined crankshaft angle is less than around 100 after the piston's top dead center. That has the advantage that the cylinder pressure will still have high values. That will greatly contribute to, in particular, the quality of controlling the internal combustion engine if the cylinder pressure sensor has been designed for registering high pressures and possibly exhibits a rather large measuring error when registering low pressures. It is particularly advantageous for the measured values of the pressure to be registered in such a way that there will be an as great as possible difference in pressure between them. The impact of a measuring error can be minimized thereby.

In a further advantageous embodiment of the invention the first temperature of the exhaust gas is determined as a function of a pressure in the combustion chamber, which pressure is determined as a function of one of the measured values of the pressure in the combustion chamber, of the magnitude that is characteristic of the volume, assigned to the respective measured value of the pressure, of the combustion chamber, of the magnitude that is characteristic of the combustion chamber's volume at which the exhaust gas has the first temperature, and of the polytropic exponent. The position of the measured value of the pressure can thus be selected independently of the crankshaft angle to which the first temperature has been assigned. That will thus be advantageous particularly if the pressure can be registered more precisely at higher pressure values and the pressure prevailing in the combustion chamber at the crankshaft angle at which the exhaust gas has the first temperature is relatively low.

In a further advantageous embodiment of the invention the first temperature of the exhaust gas is determined by means of the general gas equation and the gas constant is permanently predefined. That has the advantage that the first temperature can thereby be determined very simply and is based on the knowledge that the value of the gas constant differs only slightly.

In a further advantageous embodiment of the invention the first temperature of the exhaust gas is determined by means of the general gas equation and the gas constant is determined as a function of the air-fuel ratio in the combustion chamber of the cylinder. That has the advantage that the first temperature can be determined in a simple manner even more precisely and the air-fuel ratio in the combustion chamber will furthermore be determined in any event as part of a lambda control operation and hence be available with no additional effort.

In a further advantageous embodiment of the invention the pressure in the combustion chamber after the gas exhaust valve closes is approximated using a calculated pressure value and the second temperature of the exhaust gas is determined as a function of an environmental parameter and/or of a rotational speed and/or of the crankshaft angle of the opening or closing of the gas exhaust valve and/or as a function of a coolant temperature. There is thus no need for a physical dynamic model of the curve of the pressure of the exhaust gas while the gas exhaust valve is open. The second temperature of the exhaust gas can nonetheless be taken into account extremely precisely in this way.

In a further advantageous embodiment of the invention the pressure in the combustion chamber is determined after the gas exhaust valve closes. That is done as a function of at least one further pressure and of the volumes requiring to be assigned to the at least one further pressure and to the pressure in the combustion chamber after the gas exhaust valve closes. The further pressure is assigned to a crankshaft angle located within the crankshaft angle range in which the gas exhaust valve is closed again but the gas intake valve is not yet open again, and the further pressure is registered temporally after the pressure in the combustion chamber after the gas exhaust valve closes. The further pressure can possibly be more precisely registered in this way and hence the pressure in the combustion chamber after the gas exhaust valve closes can also be determined more precisely.

In a further advantageous embodiment of the invention a further polytropic exponent is determined as a function of at least the further pressure, of another further pressure, and of the volumes requiring to be assigned to the at least one further pressure and to the other further pressure in the combustion chamber after the gas exhaust valve closes. The other further pressure is assigned to a crankshaft angle located within the crankshaft angle range in which the gas exhaust valve is closed again but the gas intake valve is not yet open again, and the other further pressure is registered temporally after the pressure in the combustion chamber after the gas exhaust valve closes. The further polytropic exponent will then be even more precise for determining the pressure in the combustion chamber after the gas exhaust valve closes.

In a further advantageous embodiment of the invention a first fuel mass that is to be admixed in the combustion chamber of the cylinder after the gas exhaust valve has closed and before the gas intake valve has opened is determined as a function of the second temperature, and the injection valve is controlled accordingly. That is particularly advantageous in the case of an auto-igniting combustion method wherein preferably a high exhaust gas recirculation rate is set in order to attain the high ignition temperatures. Determining the first fuel mass as a function of the second temperature thus enables the main focus of combustion to be set precisely. The position of the main focus of combustion is highly dependent, without taking the second temperature into account, on the quality of the preceding combustion, which has a major impact on the second temperature.

It is also advantageous in this connection for a crankshaft angle at which the first fuel mass is admixed to be determined as a function of the second temperature. The main focus of combustion can in this way be set precisely in the case of an auto-igniting combustion method.

In a further advantageous embodiment of the invention the crankshaft angle at which a second fuel mass is admixed is determined as a function of the second temperature, with the second fuel mass being admixed into the cylinder after the gas intake valve opens. A main focus of combustion can in this way also be set precisely in the case of an auto-igniting combustion method.

BRIEF DESCRIPTION OF THE DRAWINGS

Exemplary embodiments of the invention are explained below with reference to the schematic drawings, in which:

FIG. 3 is a flowchart of a second part of the program for controlling the internal combustion engine.

Elements having the same physical design or function have been assigned the same reference numerals in all the figures.

DETAILED DESCRIPTION OF INVENTION

Figure 1:
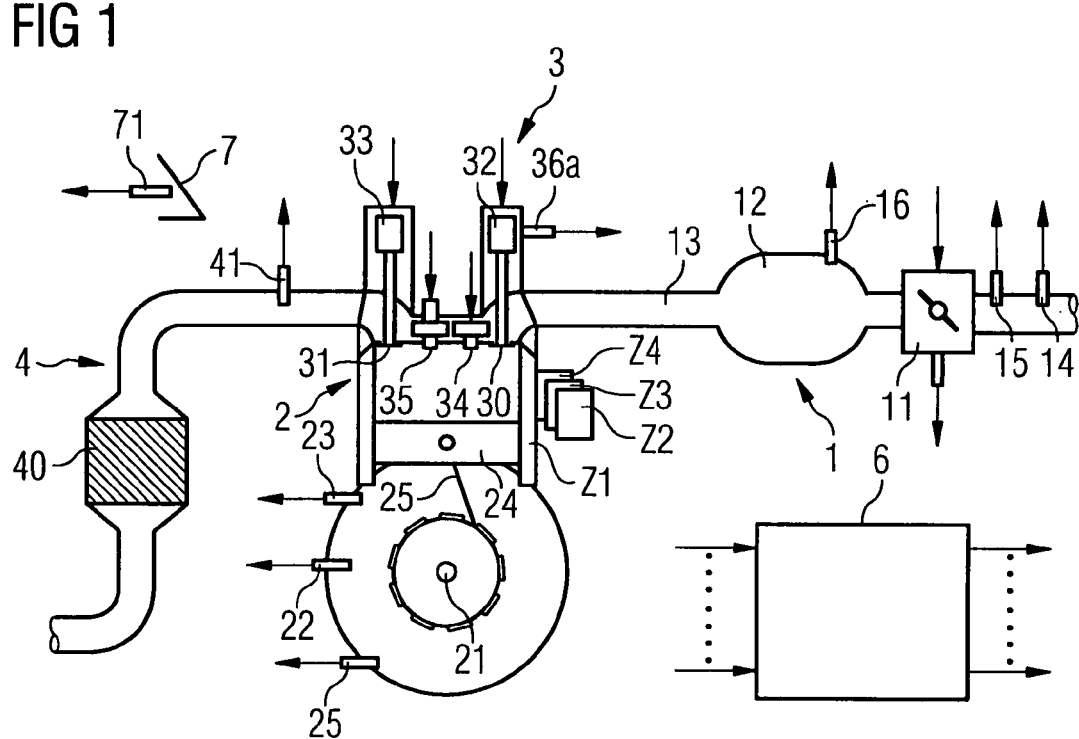
FIG. 1 shows an internal combustion engine having a control device.

An internal combustion engine (FIG. 1) comprises an intake manifold 1, an engine block 2, a cylinder head 3, and an exhaust manifold 4. The intake manifold 1 preferably includes a throttle valve 11, as well as a collector 12 and an intake pipe 13 ducted toward a cylinder Z1 via an intake port into the engine block 2. The engine block 2 further includes a crankshaft 21 coupled via a connecting rod 25 to the piston 24 of the cylinder Z1.

The cylinder head 3 includes a valve train having a gas intake valve 30, a gas exhaust valve 31, and valve drives 32, 33. The cylinder head 3 further includes an injection valve 34 and a spark plug 35. The injection valve 34 can alternatively also be located in the intake pipe 13.

The exhaust manifold 4 includes a catalytic converter 40 embodied preferably as a three-way catalytic converter.

Further provided is a control device 6 to which are assigned sensors that register various measured variables and in each case determine the measured value of the measured variable. As a function of at least one of the measured variables the control device 6 determines actuating variables that are then converted into one or more actuation signals for controlling the actuating members by means of corresponding actuators. The control device 6 can be designated also as a device for controlling the internal combustion engine.

The sensors are a pedal-position detector 71 that registers the position of an accelerator pedal 7, an air mass meter 14 that registers an air mass flow upstream of the throttle valve 11, a temperature sensor 15 that registers the temperature of the intake air, a crankshaft angle sensor 22 that registers a crankshaft angle CRK to which a rotational speed N is then assigned, a further temperature sensor 23 that registers a coolant temperature TCO, a camshaft-angle sensor 36a that registers a camshaft angle, a cylinder pressure sensor 37 that registers a pressure p in a combustion chamber of the cylinder Z1, and an exhaust probe 41 that registers a residual oxygen content of the exhaust gas and whose measurement signal is characteristic of the air-fuel ratio in the cylinder Z1. Depending on how the invention is embodied, any subset of the cited sensors can be present as well as additional sensors.

The actuating members are, for example, the throttle valve 11, the gas intake and gas exhaust valves 30, 31, the injection valve 34, and the spark plug 35.

Alongside the cylinder Z1, further cylinders Z2-Z4 can also be provided to which corresponding actuating members will then also be assigned.

Figure 2:
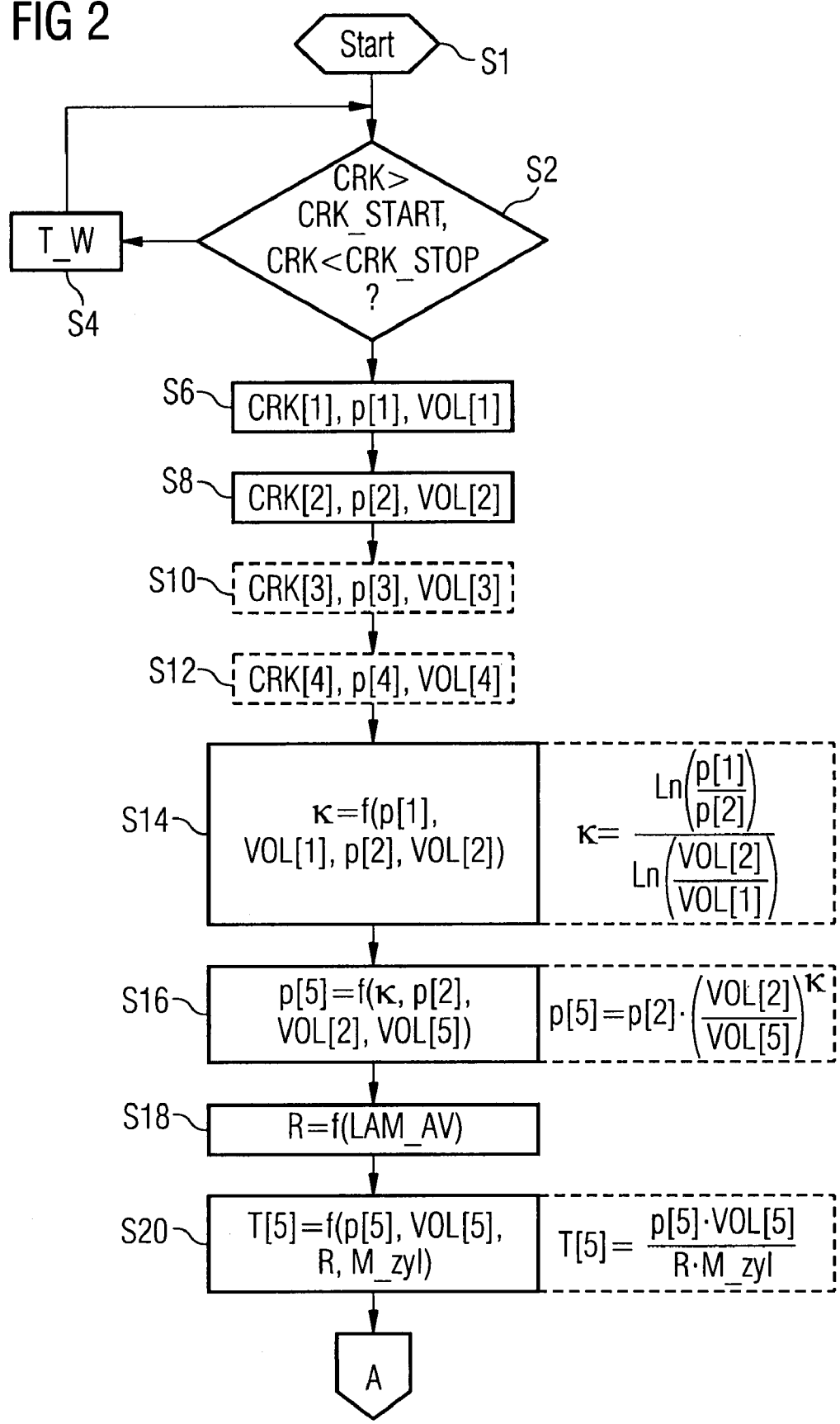
FIG. 2 is a flowchart of a first part of a program for controlling the internal combustion engine.

A program for controlling the internal combustion engine is launched at a step S1 (FIG. 2) at which variables will, where applicable, be initialized.

A check is performed at a step S2 to determine whether the current crankshaft angle CRK is greater than a start crankshaft angle CRK_START. A check is further performed to determine whether the current crankshaft angle CRK is less than a stop crankshaft angle CRK_STOP. The start crankshaft angle CRK_START is selected preferably as an approximately 80° crankshaft angle after the ignition top dead center of the piston 24. At the start crankshaft angle CRK_START it is insured that burning of the air/fuel mixture contained in the combustion chamber of the cylinder Z1 will have been reliably completed.

At a crankshaft angle CRK_STOP, selected advantageously as being around 100° after the ignition top dead center of the piston 24, it is insured that the pressure in the cylinder will still have a very high value. A registering of measured values of the pressure p in the combustion chamber of the cylinder Z1 that is performed in the ensuing steps S6 to S12 can therein take place with a high degree of quality by means of the cylinder pressure sensor 37. Cylinder pressure sensors 37 are as a rule designed for registering very high pressures. At lower pressures they may exhibit a rather large measuring error.

If the condition of step S2 has not been met, then the program will be resumed at a step S4, at which it pauses for a predefined waiting time T_W before the condition of step S2 is re-checked.

If, conversely, the condition of step S2 has been met, then a first measured value p[1] of the pressure in the combustion chamber of the cylinder Z1 will be registered at a step S6 by means of the cylinder pressure sensor 37. The numbers given in brackets for the magnitudes that follow each relate to associated values at in each case one crankshaft angle CRK. Thus the crankshaft angle CRK[1] is, for example, 80° after the ignition top dead center; p[1] is the measured value, assigned to said crankshaft angle CRK[1], of the combustion chamber pressure, and VOL[1] is the associated volume of the combustion chamber of the cylinder.

At a step S8, a second measured value p[2] of the pressure in the combustion chamber of the cylinder Z1 is registered at a crankshaft angle CRK[2] that is, for example, 85' after the ignition top dead center, and the associated volume VOL[2] of the combustion chamber is determined. At a possibly provided step S110, a third measured value p[3] of the pressure in the combustion chamber of the cylinder Z1 is registered at a crankshaft angle CRK[3] that is, for example, 90° after the ignition top dead center, and the associated volume VOL[3] of the combustion chamber of the cylinder Z1 is assigned. At a possibly provided step S12, a fourth measured value p[4] of the pressure in the combustion chamber of the cylinder is also registered at a crankshaft angle CRK[4] that is, for example 100° after the ignition top dead center, and the corresponding volume VOL[4] of the combustion chamber of the cylinder Z1 is assigned.

At a step S14, a polytropic exponent κ is then determined as a function of the first measured value p[1] of the pressure in the combustion chamber of the cylinder Z1, of the volume VOL[1], assigned thereto, of the combustion chamber of the cylinder, of the second measured value p[2] of the pressure in the combustion chamber of the cylinder Z1, and of the assigned volume VOL[2]. That is done preferably by appropriately resolving the polytropic equation based on the polytropic exponent κ, as shown by way of example in the right-hand part of step S14.

The mean of the polytropic exponent is preferably obtained through determining the polytropic exponent κ on a multiple basis using different permutations of the value pairs from steps S6 to S12. Measuring errors can thereby be reduced and the polytropic exponent κ hence determined even more accurately.

At a step S16, a pressure p[5] in the combustion chamber of the cylinder Z1 is then determined, preferably immediately before the gas exhaust valve 31 opens, as a function of the polytropic exponent κ, of the second measured value p[2] of the pressure in the combustion chamber, of the volume VOL[2], assigned thereto, of the combustion chamber of the cylinder Z1, and of the volume VOL[5] assigned to the pressure p[5] in the combustion chamber of the cylinder Z1. That is done preferably using the formula shown on the right-hand side of step S16. It can, though, alternatively also be done, given a suitable cylinder pressure sensor 37, through further registering a measured value. The pressure p[5] in the combustion chamber of the cylinder Z1 can preferably also be determined on a multiple basis as a function of further measured values of the pressure, then a mean obtained for said pressure p[5].

At a step S18, a gas constant R is determined preferably as a function of an actual value LAM_AV of the air-fuel ratio in the combustion chamber of the cylinder Z1, which ratio is derived from the measurement signal of the oxygen probe 41.

In a simpler embodiment of the program the gas constant R is assigned a predefined value at step S18. Sufficient accuracy for an individual instance can also be insured in this way during further calculating because the gas constant exhibits only slight variability.

At a step S20, the temperature T[5] of the exhaust gas contained in the cylinder Z1 is then determined as a function of the pressure p[5] in the combustion chamber of the cylinder Z1, of the volume VOL[5] assigned thereto, of the gas constant R, and of the gas mass M_ZYL contained in the cylinder Z1. The gas mass M_ZYL contained in the cylinder Z1 can be determined by means of, for example, an intake pipe model as a function of a degree of opening of the throttle valve and/or the pressure in the collector 12 and/or the air mass flow registered by the air mass sensor 15 taking account of the fuel mass MFF admixed in the cylinder Z1. The temperature T[5] is calculated preferably using the general gas equation as shown on the right-hand side of step S20.

At a step S22, a pressure p[6] in the combustion chamber of the cylinder, which is preferably the pressure at the time at which the gas exhaust valve 31 has just closed again, is determined by a measurement by means of the cylinder pressure sensor 37. Alternatively to step S22, a step S36 can be provided at which the pressure p[6] is in a particularly simple manner directly assigned an ambient pressure p_AMB.

In a further alternative to step S22, steps S38 and S40 are provided. At step S38, a pressure p[6'] is determined that is assigned to a crankshaft angle CRK lying within the crankshaft angle range in which the gas exhaust valve 31 is closed again but the gas intake valve 30 is not yet open again, and which is temporally located after the crankshaft angle assigned to the pressure p[6]. The volume VOL [6'] assigned to the pressure p[6'] is furthermore buffered.

At the ensuing step S40, the pressure p[6] is then determined as a function of the polytropic exponent κ, the pressure p[6'], and the volumes VOL[6], VOL[6']. That is done according to step S16.

In a further alternative to step S22, steps S42, S44, and S46 are provided. At step S42, the pressure p[6'] and associated volume VOL[6' ] are determined according to step S38. At least one more further pressure p[6"] is furthermore determined that is assigned to a crankshaft angle CRK lying within the crankshaft angle range in which the gas exhaust valve 31 is closed again but the gas intake valve 30 is not yet open again, and which is likewise temporally located after the crankshaft angle assigned to the pressure p[6]. The volume VOL[6"] assigned to the pressure p[6"] is furthermore buffered.

At step S44, a further polytropic exponent κ' is then determined as a function of the pressures p[6'], p[6"] and the volumes VOL[6'], VOL[6"], specifically according to the procedure of step S14. The further polytropic exponent κ' can also be determined at step S44 as a function of further pressures and assigned volumes, specifically as a mean further polytropic exponent.

Step S46 corresponds to step S40, except that the further or mean further polytropic exponent κ' is used for determining the pressure p[6].

The pressure p[6] can also be determined additionally at steps S38 or S46 on a multiple basis using different further pressures, then a mean obtained for said pressure p[6]. Measuring errors will in this way impact less on the individual pressure measurements.

At a step S24, a basic temperature Tnorm[6], requiring to be assigned to the pressure p[6] in the combustion chamber of the cylinder Z1, of the exhaust gas is then determined as a function of the polytropic exponent κ, of the pressure p[6] and the pressure p[5] in the combustion chamber of the cylinder Z1, and of the temperature T[5] of the exhaust gas in the combustion chamber of the cylinder Z1. That is done preferably using the relationship shown on the right-hand side of step S24. If step S44 was performed before step S24, the basic temperature Tnorm[6] can also be calculated as a function of the polytropic exponent κ'.

A temperature T[6], requiring to be assigned to the pressure p[6] in the combustion chamber of the cylinder Z1, of the exhaust gas in the cylinder Z1 is then determined at a step S26 as a function of the basic temperature Tnorm[6], of an ambient temperature T_AMB, and/or of a vehicle speed V of a vehicle in which the internal combustion engine is located, and/or of the coolant temperature TCO and/or of an opening angle CRK_OP and/or of a closing CRK_CL of the gas exhaust valve 31. The temperature T[6], which in particular is the exhaust gas temperature at the time the gas exhaust valve 31 closes, can in this way be determined simply and with high precision without the need for an exhaust gas counterpressure model or corresponding exhaust gas counterpressure sensor. An exhaust gas temperature sensor can furthermore also be omitted. The influence of the ambient temperature T_AMB, the vehicle speed V, or the coolant temperature TCO or the opening angle CRK_OP or the closing angle CRK_CL of the gas exhaust valve 31 on the temperature T[6] is taken into account preferably using corresponding characteristic curves or engine characteristics maps. It is alternatively or additionally possible also to take an exhaust gas temperature T_KR in the exhaust manifold and/or a pressure in the exhaust manifold P_KR into account in determining the temperature T[6].

Steps S28 to S32 that follow will be performed if the internal combustion engine is operated by means of the chamber ignition method. If, on the other hand, the internal combustion engine is operated by means of another combustion method, then the temperature T[6], which is preferably the exhaust gas temperature at the time the gas exhaust valve 31 closes, can be an input variable for any functions of the control device.

At a step S28, a first fuel mass MFF1 requiring to be supplied is determined as a function of the temperature T[6] of the exhaust gas and of a fuel mass MFF requiring to be supplied in total to the cylinder during an operating cycle of the cylinder Z1. The first fuel mass MFF1 is admixed during an intermediate compression of the cylinder Z1 in the combustion chamber of the cylinder Z1. The term "intermediate compression" is in this context understood as being the period of time elapsing after the gas exhaust valve 31 closes and before the gas intake valve 30 opens.

Through admixing of the first fuel mass MFF1 during the intermediate compression there is an exothermal reaction and fractionation of the admixed fuel owing to the as a rule still low proportion of oxygen in the exhaust gas, with the formation of radicals that accelerate subsequent burning of the air/fuel mixture in the cylinder. The timing of the air/fuel mixture can thus be effectively set by means of the first fuel mass MFF1 requiring to be supplied. A major role is therein played by the fact that the temperature T[6] can vary significantly from operating cycle to operating cycle and then will in turn have a major impact on burning during the next operating cycle. That can be compensated by appropriately setting the first fuel mass MFF1, the result thus being precise setting of the ignition time of the air/fuel mixture. At step S28, a second fuel mass is furthermore also determined as a function of the fuel mass MFF requiring to be supplied in total to the cylinder Z1 and of the first fuel mass MFF1. That is done preferably by forming the difference between the fuel mass MFF requiring to be supplied in total to the cylinder Z1 and the first fuel mass MFF1. The second fuel mass MFF2 is not admixed into the cylinder Z1 until the gas intake valve 30 has opened.

At a step S30, a crankshaft angle CRK_MFF1 of admixing of the first fuel mass MFF1 is determined preferably as a function of the temperature T[6] of the exhaust gas. The ignition time of the air/fuel mixture in the cylinder Z1 can be advantageously influenced also by the crankshaft angle CRK_MFF1 of admixing of the first fuel mass MFF1.

At a step S32, a crankshaft angle CRK_MFF2 is determined as a function of the temperature T[6] of the exhaust gas, which angle also influences the ignition time of the air/fuel mixture in the cylinder Z1.

At a step S34, corresponding actuation signals SG are then determined for controlling the injection valve 34. At steps S30 and S32 it is alternatively possible also, for example, for the crankshaft angle CRK_MFF1 and/or crankshaft angle CRK_MFF2 of admixing of the first or, as the case may be, second fuel mass MFF1, MFF2 to be independent of the temperature T[6]. It is alternatively possible also for the first fuel mass MFF1 to be independent of the temperature T[6] of the exhaust gas. Corresponding programs will then be processed in the control device 6 for controlling the injection valves 34 of further cylinders Z2 to Z4.

The invention claimed is:

1. A method for controlling an internal combustion engine having an engine block having a cylinder, a crankshaft arranged in the block, a cylinder head arranged on the block opposite the crank shaft, a piston arranged in the cylinder and connected to the crankshaft, a combustion chamber defined in the cylinder of the block and between the piston and the cylinder head, an exhaust manifold in communication with the combustion chamber as a function of the position of a gas exhaust valve, and a cylinder pressure sensor that detects a pressure in the combustion chamber, the method comprising:
   determining a polytropic exponent as a function of a plurality of measured values of the pressure in the combustion chamber registered during a power stroke of the cylinder once an air and fuel mixture contained in the cylinder has been burned and before the gas exhaust valve opens;
   determining a first exhaust gas temperature that is characteristic of the temperature of the exhaust gas before the gas exhaust valve opens;
   determining a second exhaust gas temperature that is characteristic of the temperature of the exhaust gas remaining in the combustion chamber of the cylinder after the gas exhaust valve closes, wherein the second exhaust gas temperature is determined as a function of:
      the first exhaust gas temperature,
      a pressure in the combustion chamber associated with the first exhaust gas temperature,
      a pressure in the combustion chamber after the gas exhaust valve has closed, and
      the polytropic exponent; and
   generating an actuation signal for controlling an actuating member of the internal combustion engine as a function of the second exhaust gas temperature.

2. The method as claimed in claim 1, wherein the plurality of measured values of the pressure of the exhaust gas in the combustion chamber of the cylinder are registered at a crankshaft angle greater than a predefined crankshaft angle associated with complete burning of an air and fuel mixture.

3. The method as claimed in claim 2, wherein the predefined crankshaft angle is greater than or equal to approximately 80° after the top dead center of the piston.

4. The method as claimed claim 2, wherein the predefined crankshaft angle is less than or equal to approximately 100° after the top dead center of the piston.

5. The method as claimed in claim 1, wherein the first exhaust gas temperature is determined as a function of:
   the plurality of measured values of the pressure in the combustion chamber,
   the characteristic magnitude of the volume associated with the respective measured pressure values of the combustion chamber,
   the characteristic magnitude of the volume of the combustion chamber associated with the first exhaust gas temperature, and
   the polytropic exponent.

6. The method as claimed in claim 1, wherein the gas constant is permanently predefined and the first exhaust gas temperature is determined by the general gas equation.

7. The method as claimed in one of claim 1, wherein the first exhaust gas temperature is determined by the general gas equation and the gas constant is determined as a function of the air-fuel ratio in the combustion chamber of the cylinder.

8. The method as claimed in claim 1,
   wherein the pressure in the combustion chamber after the gas exhaust valve closes is approximated using a predefined pressure value, and
   wherein the second exhaust gas temperature is determined as a function of parameters selected from the group consisting of: an environmental parameter, a rotational speed, a crankshaft angle, an opening or closing of the gas exhaust valve, a function of a coolant temperature, and combinations thereof.

9. The method as claimed in claim 8, wherein the pressure in the combustion chamber after the gas exhaust valve closes is determined as a function of:
   a volume associated with the pressure in the combustion chamber after the gas exhaust valve closes,
   a further pressure,
   a further volume associated with the further pressure, where the further pressure is assigned to a crankshaft angle that is between a range where the gas exhaust valve is closed but the gas intake valve is not open, and the further pressure is registered temporally after the pressure in the combustion chamber after the gas exhaust valve closes is registered.

10. The method as claimed in claim 9, wherein a further polytropic exponent is determined as a function of:
   the further pressure,
   an another further pressure,
   the further volume associated with the further pressure, and
   an another further volume associated with the other further pressure in the combustion chamber after the gas exhaust valve closes, where the other further pressure is assigned to a crankshaft angle that is between a range where the gas exhaust valve is closed but the gas intake valve is not open, and the other further pressure is registered temporally after the pressure in the combustion chamber after the gas exhaust valve closes is registered.

11. The method as claimed in claim 10,
   wherein a first fuel mass to be admixed into the combustion chamber of the cylinder after the gas exhaust valve has closed and before the gas intake valve has opened is determined as a function of the second temperature of the exhaust gas, and
   wherein the injection valve is controlled based on the determined a first fuel mass to be admixed into the combustion chamber.

12. The method as claimed in claim 11, wherein a first crankshaft angle where the first fuel mass is admixed is determined as a function of the second temperature.

13. The method as claimed in claim 12,
wherein a second crankshaft angle where a second fuel mass is admixed is determined as a function of the second temperature, with the second fuel mass being admixed into the cylinder after the gas intake valve opens.

14. A device for controlling an internal combustion engine having a cylinder with a combustion chamber and a piston, an exhaust manifold in communication with the combustion chamber of the cylinder as a function of the position of a gas exhaust valve, and a cylinder pressure sensor that registers a pressure in the combustion chamber of the cylinder, comprising:
a polytropic exponent determining unit including program instructions stored in computer-readable media and executable to determine a polytropic exponent as a function of a plurality of measured values of the pressure in the combustion chamber that are registered during the power stroke of the cylinder once an air and fuel mixture contained in the cylinder has been burned and before the gas exhaust valve opens;
a first exhaust gas temperature determining unit including program instructions stored in computer-readable media and executable to determine a first exhaust gas temperature that is characteristic of the temperature of the exhaust gas before the gas exhaust valve opens;
a second exhaust gas temperature determining unit including program instructions stored in computer-readable media and executable to determine a second exhaust gas temperature that is characteristic of the temperature of the exhaust gas remaining in the combustion chamber of the cylinder after the gas exhaust valve closes as a function of:
the first exhaust gas temperature,
the pressure assigned to the first exhaust gas temperature in the combustion chamber,
the pressure in the combustion chamber after the gas exhaust valve has closed, and
the polytropic exponent; and
an actuation signal generating unit including program instructions stored in computer-readable media and executable to generate an actuation signal for controlling an actuating member of the internal combustion engine as a function of the second exhaust gas temperature.

15. The device as claimed in claim 14, wherein the plurality of measured pressure values are registered once the air and fuel mixture is completely burned.

* * * * *